US009259915B2

(12) United States Patent
Dooley et al.

(10) Patent No.: US 9,259,915 B2
(45) Date of Patent: Feb. 16, 2016

(54) AQUEOUS INK JET BLANKET

(71) Applicant: Xerox Corporation, Norwalk, CT (US)

(72) Inventors: Brynn Mary Dooley, Toronto (CA); Gabriel Iftime, Cupertino, CA (US); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/203,667

(22) Filed: Mar. 11, 2014

(65) Prior Publication Data

US 2015/0258778 A1    Sep. 17, 2015

(51) Int. Cl.
*B41J 2/005*    (2006.01)
*C08L 83/04*    (2006.01)

(52) U.S. Cl.
CPC .............. *B41J 2/0057* (2013.01); *C08L 83/04* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ...................... 347/100–105, 95, 96, 21, 20, 9; 106/31.6, 31.13, 31.27; 523/160, 161
See application file for complete search history.

(56) References Cited

U.S. PATENT DOCUMENTS

| | | | |
|---|---|---|---|
| 5,099,256 A | 3/1992 | Anderson | |
| 5,753,307 A | 5/1998 | Badesha et al. | |
| 6,312,817 B1 * | 11/2001 | Chen et al. | 428/447 |
| 6,479,158 B1 | 11/2002 | Kuntz et al. | |
| 2003/0234841 A1 | 12/2003 | Pan et al. | |
| 2006/0038869 A1 | 2/2006 | Pan et al. | |
| 2006/0152566 A1 * | 7/2006 | Taniuchi et al. | 347/103 |
| 2011/0142508 A1 | 6/2011 | Qi et al. | |
| 2012/0261182 A1 | 10/2012 | Megaridis et al. | |

OTHER PUBLICATIONS

Office Action for U.S. Appl. No. 14/165,897, dated Mar. 17, 2015, 14 pages.
U.S. Appl. No. 13/716,889, Office Action dated Aug. 8, 2014, 9 pages.
U.S. Appl. No. 13/716,889, Notice of Allowance dated Nov. 26, 2014, 10 pages.
U.S. Appl. No. 14/165,897, Notice of Allowance dated Jul. 17, 2015, 12 pgs.
U.S. Appl. No. 14/165,899, Office Action 1 dated Jun. 4, 2015, 16 pgs.

* cited by examiner

*Primary Examiner* — Manish S Shah
(74) *Attorney, Agent, or Firm* — Hoffman Warnick LLC

(57) ABSTRACT

Described herein is a transfer member for use in aqueous ink jet printer. The transfer member includes a surface layer of a cross-linked polydiphenylsiloxane network formed from a silanol terminated dialkylsiloxane-diphenylsiloxane copolymer and a trialkoxy- or trihydroxysilane terminated polydialkylsiloxane. The diphenylsiloxane moieties are from about 5 weight percent to about 80 weight percent of the network. The trialkoxy- or trihydroxysilane terminated polydialkylsiloxane are from about 1 weight percent to about 60 weight percent of the network. All silane molecules are bonded together via silicon oxide (Si—O—Si) linkages in a single system. The network is insoluble in solvents selected from the group consisting of: ketones, chlorinated solvents and ethers.

20 Claims, 3 Drawing Sheets

AQUEOUS INK JET BLANKET

BACKGROUND

1. Field of Use

This disclosure is generally directed to inkjet transfix apparatuses and methods. In particular, disclosed herein is a method and composition that improves the anti-contaminant properties and the thermal stability of transfix blankets.

2. Background

Inkjet systems in which a liquid or melt solid ink is discharged through an ink discharge port such as a nozzle, a slit and a porous film are used in many printers due to their characteristics such as small size and low cost. In addition, an inkjet printer can print not only on paper substrates, but also on various other substrates such as textiles, rubber and the like.

During the printing process, various intermediate media (e.g., transfer belts, intermediate blankets or drums) may be used to transfer the formed image to the final substrate. In intermediate transfix processes, aqueous latex ink is inkjetted onto an intermediate blanket where the ink film is dried with heat. The dried image is subsequently transfixed on to the final paper substrate. For this process to properly operate, the intermediate blanket has to satisfy two conflicting requirements—the first requirement is that ink has to spread well on the blanket and the second requirement is that, after drying, the ink should release from the blanket.

In addition, blanket must possess thermal stability and moderate wettability yet still exhibit non-stick or anti-contaminant properties.

Thus, there is a need for a way to provide a blanket that has the desired spreading and release properties for aqueous inks, while providing thermal stability and anti-contaminant properties to address the above problems faced in transfix process.

SUMMARY

Disclosed herein is a transfer member for use in aqueous ink jet printer. The transfer member includes a surface layer of a cross-linked polydiphenylsiloxane network formed from a silanol terminated dialkylsiloxane-diphenylsiloxane copolymer and a trialkoxy- or trihydroxysilane terminated polydialkylsiloxane. The diphenylsiloxane moieties are from about 5 weight percent to about 80 weight percent of the network. The trialkoxy- or trihydroxysilane terminated polydialkylsiloxane are from about 1 weight percent to about 60 weight percent of the network. All silane molecules are bonded together via silicon oxide (Si—O—Si) linkages in a single system. The network is insoluble in solvents selected from the group consisting of: ketones, chlorinated solvents and ethers.

Described herein is an ink jet printer that includes a transfer member. The transfer member includes a surface layer of a cross-linked polydiphenylsiloxane network. The cross-linked polydiphenylsiloxane is formed from a silanol terminated dialkylsiloxane-diphenylsiloxane copolymer, a trialkoxy- or trihydroxysilane terminated polydialkylsiloxane and a polydialkoxysilane. The polydialkoxysilane is present in an amount of from about 0.1 weight percent to about 20 weight percent of the network. The diphenylsiloxane moieties are from about 5 weight percent to about 80 weight percent of the network. All silane molecules are bonded together via silicon oxide (Si—O—Si) linkages in a single system. The network is insoluble in solvents selected from the group consisting of ketones, chlorinated solvents and ethers. The ink jet printer includes a print head adjacent said transfer member for ejecting aqueous ink droplets onto the surface layer of the transfer member to form an ink image. The ink jet printer includes a transfixing station located adjacent the transfer member and downstream from said print head. The transfixing station forms a transfixing nip with the transfer member at said transfixing station. The ink jet printer includes a transporting device for delivering a recording medium to the transfixing nip wherein the ink image is transferred and fixed to the recording medium.

Described herein is an ink jet printer that includes a transfer member. The transfer member includes a surface layer of a cross-linked polydiphenylsiloxane network. The cross-linked polydiphenylsiloxane is formed from a silanol terminated dialkylsiloxane-diphenylsiloxane copolymer and a trialkoxy- or trihydroxysilane terminated polydialkylsiloxane. The diphenylsiloxane moieties are from about 5 weight percent to about 80 weight percent of the network. All silane molecules are bonded together via silicon oxide (Si—O—Si) linkages in a single system. The network is insoluble in solvents selected from the group consisting of ketones, chlorinated solvents and ethers. The ink jet printer includes a print head adjacent said transfer member for ejecting aqueous ink droplets onto the surface layer of the transfer member to form an ink image. The ink jet printer includes a transfixing station located adjacent the transfer member and downstream from said print head. The transfixing station forms a transfixing nip with the transfer member at said transfixing station. The ink jet printer includes a transporting device for delivering a recording medium to the transfixing nip wherein the ink image is transferred and fixed to the recording medium.

Figure 1:
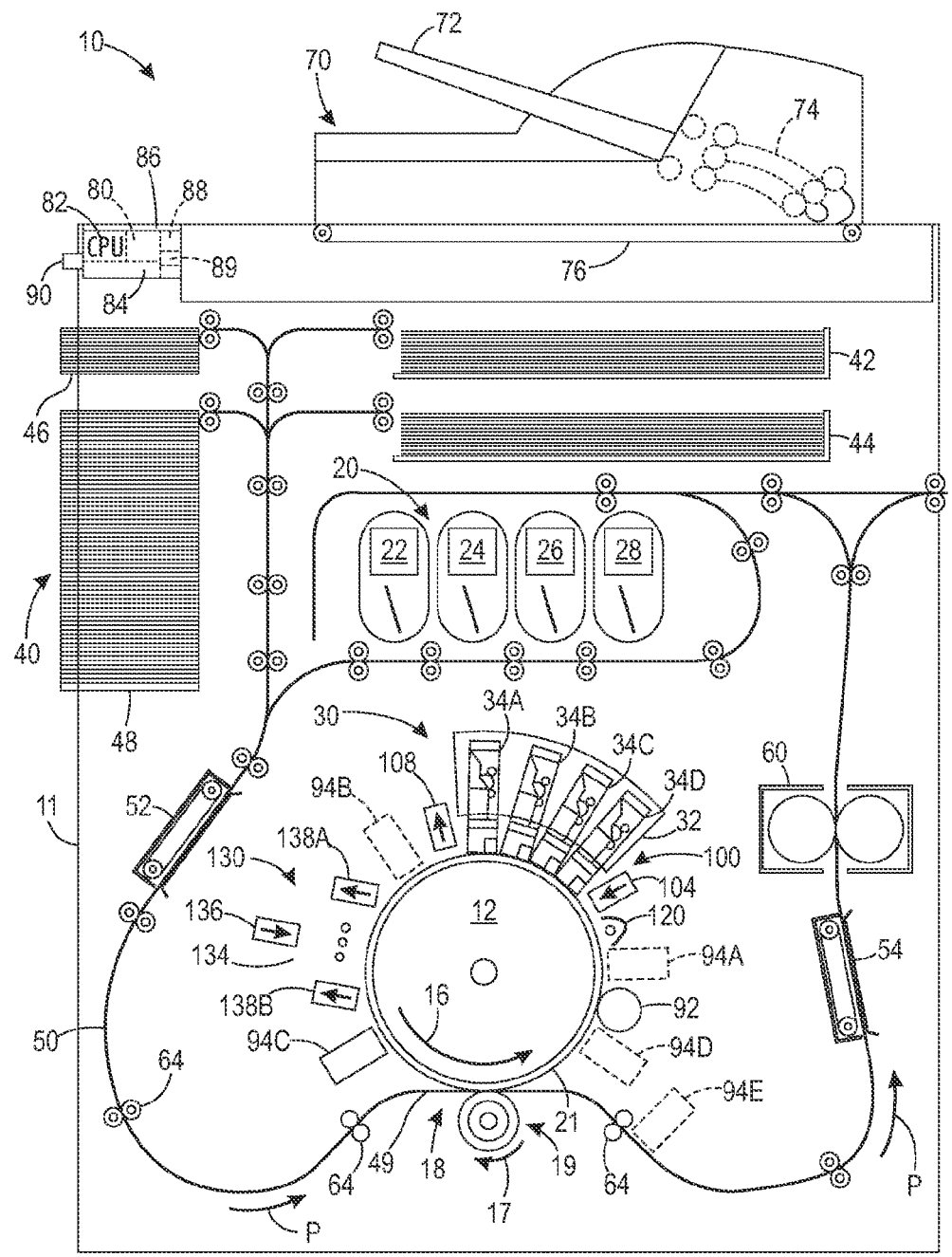
FIG. 1 is a schematic drawing of an aqueous indirect inkjet printer that produces ink images on media sheets.

It should be noted that some details of the figures have been simplified and are drawn to facilitate understanding of the embodiments rather than to maintain strict structural accuracy, detail, and scale.

DETAILED DESCRIPTION

For a general understanding of the present embodiments, reference is made to the drawings. In the drawings, like reference numerals have been used throughout to designate like elements. As used herein, the terms "printer," "printing device," or "imaging device" generally refer to a device that produces an image with one or more colorants on print media and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Phase-change ink printers use phase-change ink, also referred to as a solid ink, which is in a solid state at room temperature but melts into a liquid state at a higher operating temperature. The liquid ink drops are printed onto an image receiving surface in either a direct or indirect printer.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as a print medium or the surface of an intermediate member that carries an ink image, moves past the printheads in a process direction through the print zone. The inkjets in the printheads eject ink drops in rows in a cross-process direction, which is perpendicular to the process direction across the image receiving surface. As used in this document, the term "aqueous ink" includes liquid inks in which colorant is in solution with water and/or one or more solvents.

FIG. 1 illustrates a high-speed aqueous ink image producing machine or printer 10. As illustrated, the printer 10 is an indirect printer that forms an ink image on a surface of a blanket 21 mounted about an intermediate rotating member 12 and then transfers the ink image to media passing through a nip 18 formed with the blanket 21 and intermediate rotating member 12. A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media.

The printer 10 includes a frame 11 that supports directly or indirectly operating subsystems and components, which are described below. The printer 10 includes an intermediate rotating member 12 that is shown in the form of a drum, but can also be configured as a supported endless belt. The intermediate rotating member 12 has an outer blanket 21 mounted about the circumference of the member 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a media sheet 49. The transfer member 12 can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt. The transfer member 12 can be a single layer or multiple layers.

The surface 21 of transfer member 12 is formed of a material having a relatively low surface energy to facilitate transfer of the ink image from the surface 21 to the media sheet 49 in the nip 18. Such materials include silicone, fluorosilicone, fluoroelastomers such as Viton®. Low energy surfaces, however, do not aid in the formation of good quality ink images as they do not spread ink drops as well as high energy surfaces. Disclosed in more detail below is a method and apparatus that improves the spreading ability of the ink to provide good ink images while allowing for proper release of the ink images onto the recording substrate 49. A surface maintenance unit (SMU) 92 removes residual ink left on the surface 21 of the blanket 12 after the ink images are transferred to the media sheet 49. The low energy surface 21 of the blanket does not aid in the formation of good quality ink images because drops of ink form a high contact angle and do not wet the surface and spread as well as they do on high surface energy materials. Consequently, some embodiments of SMU 92 also apply a coating to the blanket surface. The coating helps aid in wetting the surface of the blanket, inducing solids to precipitate out of the liquid ink, providing a solid matrix for the colorant in the ink, and aiding in the release of the ink image from the blanket. Such coatings include surfactants, starches, and the like. In embodiments a dryer (not shown) is included after in the SMU 92 when a coating is applied. In other embodiments, a surface energy applicator 120, which is described in more detail below, operates to treat the surface of blanket for improved formation of ink images without requiring application of a coating by the SMU 92.

The SMU 92 can include a coating applicator having a reservoir with a fixed volume of coating material and a resilient donor roller, which can be smooth or porous and is rotatably mounted in the reservoir for contact with the coating material. The donor roller can be a smooth elastomeric roller or can be of an anilox type. The coating material is applied to the surface 21 of the blanket 12 to form a thin layer on the blanket surface. The SMU 92 is operatively connected to a controller 80, described in more detail below, to enable the controller to operate the donor roller, metering blade and cleaning blade selectively to deposit and distribute the coating material onto the surface of the blanket and remove untransferred ink pixels from the surface 21 of the blanket 12. Alternatively a separate system positioned against the surface 21 of blanket 12 prior to SMU 92 could serve the cleaning function of removing residual ink or debris from the blanket enabling the SMU 92 system to concentrate on the application of coating.

Continuing with the general description, the printer 10 includes an optical sensor 94A, also known as an image-on-drum ("IOD") sensor, that is configured to detect light reflected from the surface 21 of the transfer member 12, the coating applied to the surface 21 as well as any ink that may have been applied to the surface 12 as the member 12 rotates past the sensor. The optical sensor 94C includes a linear array of individual optical detectors that are arranged in the cross-process direction across the surface 21 of the transfer member 12. The optical sensor 94C generates digital image data corresponding to light that is reflected from the surface 21. The optical sensor 94C generates a series of rows of image data, which are referred to as "scanlines," as the transfer member 12 rotates in the direction 16 past the optical sensor 94C. In one embodiment, each optical detector in the optical sensor 94C further comprises three sensing elements that are sensitive to frequencies of light corresponding to red, green, and blue (RGB) reflected light colors. The optical sensor 94C also includes illumination sources that shine red, green, blue or white light onto the surface 21. The optical sensor 94C shines complementary colors of light onto the image receiving surface to enable detection of different ink colors using the RGB elements in each of the photodetectors. The image data generated by the optical sensor 94C is analyzed by the controller 80 or other processor in the printer 10 to identify the thickness of ink image and wetting enhancement coating (explained in more detail below) on the surface 21 and the area coverage. The thickness and coverage can be identified from either specular or diffuse light reflection from the blanket surface and coating. Other optical sensors, such as 94B, 94A, and 94D, are similarly configured and can be located in different locations around the surface 21 to identify and evaluate other parameters in the printing process, such as missing or inoperative inkjets and ink image formation prior to image drying (94B), ink image treatment for image transfer (94C), the efficiency of the ink image transfer (94D) and pre-coating uniformity (94A). Alternatively, some embodiments can include an optical sensor to generate additional data that can be used for evaluation of the image quality on the media (94E).

The printer 10 also can include a surface energy applicator 120 positioned next to the surface 21 of the transfer member 12 at a position immediately prior to the surface 21 entering the print zone formed by printhead modules 34A-34D. The surface energy applicator 120 can be, for example, a corotron, a scorotron, or a biased charge roller. The surface energy applicator 120 is configured to emit an electric field between the applicator 120 and the surface 21 that is sufficient to ionize the air between the two structures and apply negatively charged particles, positively charged particles, or a combination of positively and negatively charged particles to the surface 21. The electric field and charged particles increase the surface energy of the blanket surface and coating. The increased surface energy of the surface 21 enables the ink drops subsequently ejected by the printheads in the modules 34A-34D to adhere to the surface 21 and coalesce.

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. The air supply 104 and air return 108 can be positioned between the modules (34A-34D) in embodiments. This regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed. The temperature and humidity of the input air can be controlled, generally with the humidity being low and the temperature being colder than the printheads.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the intermediate transfer member 12 and ejects ink drops onto the surface 21. A printhead module can include a single printhead or a plurality of printheads configured in a staggered arrangement. Each printhead module is operatively connected to a frame (not shown) and aligned to eject the ink drops to form an ink image on the surface 21. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the surface 21 exits the print zone, the image passes under an image dryer 130. The image dryer 130 includes an infrared heater 134, a heated air source 136, and air returns 138A and 138B. The infrared heater 134 applies infrared heat to the printed image on the surface 21 of the transfer member 12 to evaporate water or solvent in the ink. The heated air source 136 directs heated air over the ink to supplement the evaporation of the water or solvent from the ink. The air is then collected and evacuated by air returns 138A and 138B to reduce the interference of the air flow with other components in the printing area.

As further shown, the printer 10 includes a recording media supply and handling system 40 that stores, for example, one or more stacks of paper media sheets of various sizes. The recording media supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut media sheets 49, for example. The recording media supply and handling system 40 also includes a substrate handling and transport system 50 that has a media pre-conditioner assembly 52 and a media post-conditioner assembly 54. Assembly 52 pre-conditioner can include a heater to increase the temperature of the media. The printer 10 includes an optional conditioning device 60 to apply additional heat and/or pressure to the print medium after the print medium passes through the transfix nip 18. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the image receiving member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image data for an image to be produced are sent to the controller 80 from either the scanning system 76 or via the online or work station connection 90 for processing and generation of the printhead control signals output to the printhead modules 34A-34D. Additionally, the controller 80 determines and/or accepts related subsystem and component controls, for example, from operator inputs via the user interface 86, and accordingly executes such controls. As a result, aqueous ink for appropriate colors are delivered to the printhead modules 34A-34D. Additionally, pixel placement control is exercised relative to the surface 21 to form ink images corresponding to the image data, and the media, which can be in the form of media sheets 49, are supplied by any one of the sources 42, 44, 46, 48 and handled by recording media transport system 50 for timed delivery to the nip 18. In the nip 18, the ink image is transferred from the surface 21 of the transfer member 12 to the media substrate within the transfix nip 18.

Although the printer 10 in FIG. 1 is described as having a blanket 12 mounted about an intermediate rotating member, other configurations of an image receiving surface can be used. For example, the intermediate rotating member can have a surface integrated into its circumference that enables an aqueous ink image to be formed on the surface. Alternatively, a blanket 12 could be configured as an endless belt and rotated as the member is in FIG. 1. Other variations of these structures can be configured for this purpose. As used in this document, the term "intermediate imaging surface" includes these various configurations.

In some printing operations, a single ink image can cover the entire surface 21 (single pitch) or a plurality of ink images can be deposited on the surface 21 (multi-pitch). In a multi-pitch printing architecture, the surface 21 of the transfer member 12 (also referred to as image receiving member) can be partitioned into multiple segments, each segment including a full page image in a document zone (i.e., a single pitch) and inter-document zones that separate multiple pitches formed on the surface 21. For example, a two pitch image receiving member includes two document zones that are separated by two inter-document zones around the circumference of the surface 21. Likewise, for example, a four pitch image receiving member includes four document zones, each corresponding to an ink image formed on a single media sheet, during a pass or revolution of the surface 21.

Once an image or images have been formed on the surface under control of the controller 80, the illustrated inkjet printer 10 operates components within the printer to perform a process for transferring and fixing the image or images from the surface 21 to media. In the printer 10, the controller 80 operates actuators to drive one or more of the rollers 64 in the media transport system 50 to move the media sheet 49 in the process direction P to a position adjacent the transfix roller 19 and then through the transfix nip 18 between the transfix roller 19 and the surface 21 of transfer member 12. The transfix roller 19 applies pressure against the back side of the recording media 49 in order to press the front side of the recording media 49 against the surface 21 of the transfer member 12. Although the transfix roller 19 can also be heated, in the embodiment of FIG. 1, the transfix roller 19 is unheated. Instead, the pre-heater assembly 52 for the media sheet 49 is provided in the media path leading to the nip. The pre-conditioner assembly 52 conditions the media sheet 49 to a predetermined temperature that aids in the transferring of the image to the media, thus simplifying the design of the transfix roller. The pressure produced by the transfix roller 19 on the back side of the heated media sheet 49 facilitates the transfixing (transfer and fusing) of the image from the transfer member 12 onto the media sheet 49.

The rotation or rolling of both the blanket 12 and the transfix roller 19 not only transfixes the images onto the media sheet 49, but also assists in transporting the media sheet 49 through the nip. The blanket 12 continues to rotate to continue the transfix process for the images previously applied to the coating and blanket 12.

In embodiments, a wetting enhancement coating (WEC) is provided and dried to form a higher surface energy coating on the surface 21 of the transfer member 12, improved wetting of the ink image on the transfer member 12 is obtained. The ink image is applied to the wetting enhancement coating film. The dried film is incompatible with the ink and/or is thick enough to avoid the coating being completely re-dissolved into the ink.

As shown and described above the transfer member 12 or image receiving member initially receives the ink jet image. After ink drying, the transfer member 12 releases the image to the final print substrate during a transfer step in the nip 18. The transfer step is improved when the surface 21 of the transfer member 12 has a relatively low surface energy. However, a surface 21 with low surface energy works against the desired initial ink wetting (spreading) on the transfer member 12. Unfortunately, there are two conflicting requirements of the surface 21 of transfer member 12. The first aims for the surface to have high surface energy causing the ink to spread and wet (i.e. not bead-up). The second requirement is that the ink image once dried has minimal attraction to the surface 21 of transfer member 12 so as to achieve maximum transfer efficiency (target is 100%), this is best achieved by minimizing the surface 21 surface energy.

As noted above, an aqueous printer having the structure shown in FIG. 1 can have one optical sensor 94A, 94B, 94C, or 94D, or any combination or permutation of image sensors at these positions about the transfer member 12. The advantage of having multiple image sensors is that any subsystem affecting the print cycle can be monitored without having to disable the ability to print continuously. When a subsystem that needs to be monitored is not immediately followed by an optical sensor, then the subsystems that lie between that subsystem and the next available optical sensor must be disengaged. An operation must occur with respect to a portion of the intermediate imaging surface followed by continued rotation of the intermediate imaging surface so that portion reaches the optical sensor, which is operated to generate image data of the surface that can be analyzed to evaluate the operation. The intermediate imaging surface then continues to rotate until the portion of the surface that was imaged reaches the next operational station position so an operation can be performed. The surface is rotated until that portion on which the operation occurred reaches the optical sensor for imaging so the next operation performed on the surface can be evaluated. This requirement disables the ability to print for at least one rotation of the drum any time a subsystem needs to be monitored. For example, in a printer embodiment having a single optical sensor and the need to monitor the surface applicator 120, the intermediate imaging surface continues rotation following surface treatment of a portion of the surface by the surface energy applicator 120 without operating the printheads 34A to 34D to eject ink or activating the heater 130 so the treated portion of the imaging surface can be imaged by optical sensor 94C, when optical sensor 94C is the only optical sensor in the printer. This example can be extended to complete a multi-pass print cycle that enables printer embodiments with only one optical sensor or less than all of the optical sensors 94A, 94B, 94C, and 94D to generate image data of the intermediate imaging surface and scrutinize the performance of various components in the printer.

In printers that have all of the optical sensors 94A, 94B, 94C, and 94D, image data of the imaging surface can be generated after each of the operations of surface treatment and printing with applicator 120 and printheads 34A-34D, drying the ink image with heater 130, transferring the image at nip 18, and cleaning the surface with SMU 92. If evaluation of the surface treatment needs to be tested independently of printing, then another optical sensor could be installed between the applicator 120 and the printhead 34D, although the characteristics on the imaging surface provide good insight into the effectiveness of the surface treatment. Additionally, optical sensor 94E is provided if the quality of the ink image on media is to be tested.

Returning to FIG. 1, a surface maintenance unit (SMU) 92 includes a coating station such as coating applicator, a metering blade, and, in some embodiments, a cleaning blade. The coating applicator can further include a reservoir having a fixed volume of wetting enhancement fluid and a resilient donor member, which can be smooth or porous and is mounted in the reservoir for contact with the wetting enhancement coating material and the metering blade. The wetting enhancement coating is applied to the surface 21 of transfer member 12 to form a thin layer on the surface 21. The SMU 92 is operatively connected to a controller 80, to enable the controller to operate the donor member, metering blade and cleaning blade selectively to deposit and distribute the coating material onto the surface 21 of transfer member 12. The SMU 92 can include a dryer positioned between the coating station and the print head to increase to film formation of the wetting enhancement coating.

After transfer, the WEC and ink are fixed to the recording media 49 with the WEC acting as a protective image overcoat. Another advantage of the WEC is that it eliminates potential life issues associated with the transfer member 12 after many paper touches since the WEC always "refreshes" the surface 21 of the transfer member 12 after each print cycle.

Disclosed herein is a transfer member or blanket that includes a surface layer of a polydiphenylsiloxane-based material containing covalently bound diphenylsiloxane which imparts moderate wettability to a surface. Despite an increase surface free energy (SFE) relative to traditional non-stick materials (e.g. polydimethylsilicone, polytetrafluoroethylene), these polydiphenylsiloxane-based materials are still resistant to contamination. In addition to their moderate surface free energy, these materials exhibit good thermal stability giving rise to a wide operating window over a large temperature range. Furthermore, the cross-linking density is adjustable based on monomer choice which enables tuning of the mechanical properties.

The composition of the surface layer having a polydiphenylsiloxane-based material containing covalently bound diphenylsiloxane (—Si(C$_6$H$_5$)$_2$O— or DPS) moieties into the network is described. The incorporation of DPS yields an increased surface free energy which provides increased wetting ability relative to PDMS silicones.

The composition includes a silanol terminated dialkylsiloxane-diphenylsiloxane copolymer as shown below (Structure 1):

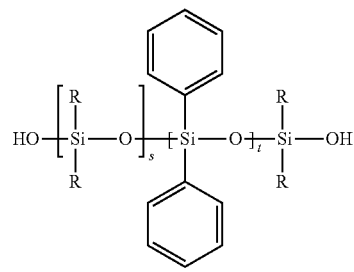

wherein R is a linear, branched, or cyclic saturated or unsaturated alkyl group containing from about 1 to 30 carbon atoms and s is from about 1 to about 500 and t is from about 1 to about 300. To enable improved wetting the diphenylsiloxane units are incorporated into the network from about 5 weight percent to about 80 weight percent or from about 7 weight percent to about 75 weight percent or from about 10 weight percent to about 70 weight percent of the network.

The composition includes a trialkoxy- or trihydroxysilane terminated polydialkylsiloxane crosslinker as shown below (Structure 2):

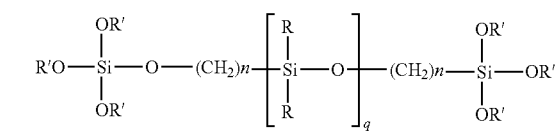

wherein R is a linear, branched, or cyclic saturated or unsaturated alkyl group containing from about 1 to 30 carbon atoms, R' is a hydrogen atom or a linear, branched, or cyclic saturated or unsaturated alkyl group containing from about 1 to 30 carbon atoms, n is from about 0 to about 50 or from about 0 to about 30 or from about 0 to about 15 and q is from about 1 to about 200 or from about 1 to about 150 or from about 1 to about 100. The trialkoxy- or trihydroxysilane terminated polydialkylsiloxane crosslinker is present in an amount of from about 1 weight percent to about 60 weight percent or from about 5 weight percent to about 55 weight percent or from about 10 weight percent to about 50 weight percent of the network.

The composition includes a polydialkoxysilane crosslinker as shown below (Structure 3):

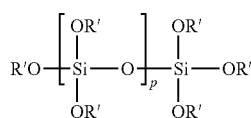

The polydialkoxysilane is present in an amount of from about 0 weight percent to about 25 weight percent or from about 0.1 weight percent to about 20 weight percent or from about 0.5 weight percent to about 10 weight percent of the network wherein R' is defined previously and p is from about 0 to about 100 or from about 0 to about 80 or from about 0 to about 30. The network is made up of at least 5 weight percent to about 60 weight percent silicon or at least 7 weight percent to about 55 weight percent silicon or at least 10 weight percent to about 50 weight percent silicon. The silicon is provided by the trialkoxysilane terminated polydialkoxylsiloxane, the silanol terminated dialkylsiloxane-diphenylsiloxane and the polydialkoxysilane.

The network contains 0.1 weight percent to about 5 weight percent of a catalyst. The catalyst is selected from the group consisting of titanate catalysts, zirconate catalysts and tin catalysts for example titanium(IV) ethoxide (tetraethyl orthotitanate), titanium(IV) isopropoxide (tetraisopropyl orthotitanate), titanium(IV) butoxide (TYZOR® TBT), titanium diisoporpoxide bis(acetylacetanoate) (TYZOR® AA), titanium(IV) (triethanolaminato) isopropoxide (TYZOR® TE), titanium(IV) 2-ethylhexoxide (TYZOR® TOT), titanium di-n-butoxide(bis-2,4-pentanedionate), titanium diisopropoxide(bis2,4-pentanedionate), titanium trimethylsiloxide, zirconium(IV) bis(diethylcitrato)dipropoxide (TYZOR® ZEC), bis(2-ethylhexanoate)tin, bis(neodecanoate)tin, tin(II) oleate, di-n-butyldilauryltin, di-n-butyldiacetoxytin. The catalyst employed may be one or a combination of a titanate, zirconate, or tin catalyst.

The silanol terminated dialkoxysiloxane-diphenylsiloxane, trialkoxy- or trihydroxysilane terminated polydialkoxysilane and polydialkoxysilane may be crosslinked via condensation chemistry under neutral pH, where hydrolysis and condensation of alkoxide or hydroxide groups occurs and upon curing at elevated temperatures, produces a crosslinked polydiphenylsiloxane coating that may be used as a coating to form a surface layer for a blanket in an aqueos ink jet transfix machine. The crosslinked polydiphenylsiloxane-based coating prepared according to the instant disclosure can withstand high temperature conditions without melting or degradation, is mechanically robust under such conditions and provides good wettablility.

The curing processes according to the instant disclosure may be carried out at any suitable temperature, such as from about 25° C. to about 200° C., or from about 40° C. to about 150° C., or from about 65° C. to about 100° C.

The monomers are networked together so that all monomers are bonded together in the cured coating via silicon oxide (Si—O—Si) linkages. Therefore, a molecular weight cannot be given for the polydiphenylsiloxane-based networked polymer because the coating is crosslinked into one system.

Solvents used for processing of precursors and coating of layers include organic hydrocarbon solvents, alcohols such as methanol, ethanol, isopropanol, and n-butanol and fluorinated solvents. Further examples of solvents include ketones such as methyl ethyl ketone, methyl isobutyl ketone, and cyclohexanone. Mixtures of solvents may be used. In embodiments, the solvent may be an alcohol solvent. In embodiments, the alcohol solvent may be present in an amount of at least 20 weight percent of the formulation composition, such as from about 20 weight percent to about 70 weight percent, or from about 30 weight percent to about 50 weight percent of the formulation composition.

In embodiments, the liquid coating formulation may be applied to a substrate. Following coating of the liquid formulation onto a substrate, a cured film may be formed upon standing or from drying with heat treatment, forming a fully networked polydiphenylsiloxane coating on the substrate.

In embodiments, the networked polydiphenylsiloxane composition does not dissolve when exposed to solvents (such as ketones, chlorinated solvents, ethers etc.), does not degrade at temperatures up to 350° C., and is stable at higher temperatures, depending on the system.

In embodiments, the coating solution may be deposited on a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, web-coating, roll-coating, extrusion molding, laminating, or the like. The thickness of the coating solution may be from about 100 nm to about 200 μm, such as from about 500 nm to about 100 μm, or from about 1 μm to about 50 μm.

In embodiments, solids loading of from about 20 weight percent to about 80 weight percent, such as from about 30 weight percent to about 70 weight percent, or from about 40 weight percent to about 60 weight percent, may be employed.

In addition to the moderate surface free energy of the networked polydiphenylsiloxane (about 25 mN/m to about 35 mN/m), the networked polydiphenylsiloxane exhibit good thermal stability. The mass loss of the networked polydiphenylsiloxane at about 300° C. is about 1.2 percent by weight. The thermal stability allows a wider operating window for the ink jet transfix apparatus. Furthermore, the cross-linking density is adjustable based on monomer choice which enables tuning of their mechanical properties.

The coating is provided on a substrate to form the blanket or transfer member. Suitable substrates include silicone, fluorosilicone, and fluoroelastomers such as Viton® and fluoroplastics. Alternatively, aluminum, polyurethane, polyethylene terephthalate, and polyimide be used as a substrate.

Figure 2:
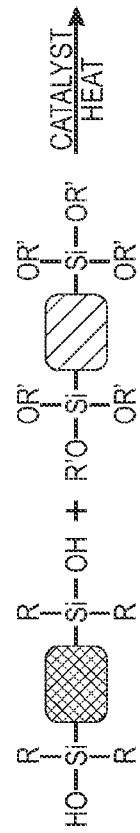
FIG. 2 is a schematic of a polydiphenylsiloxane-based crosslinked network.
Figure 2:
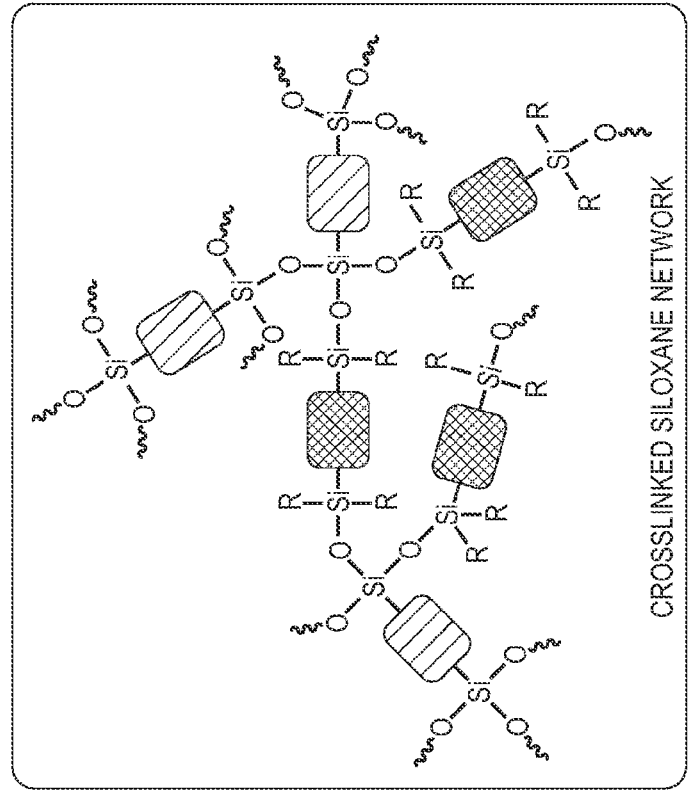
Figure 3:
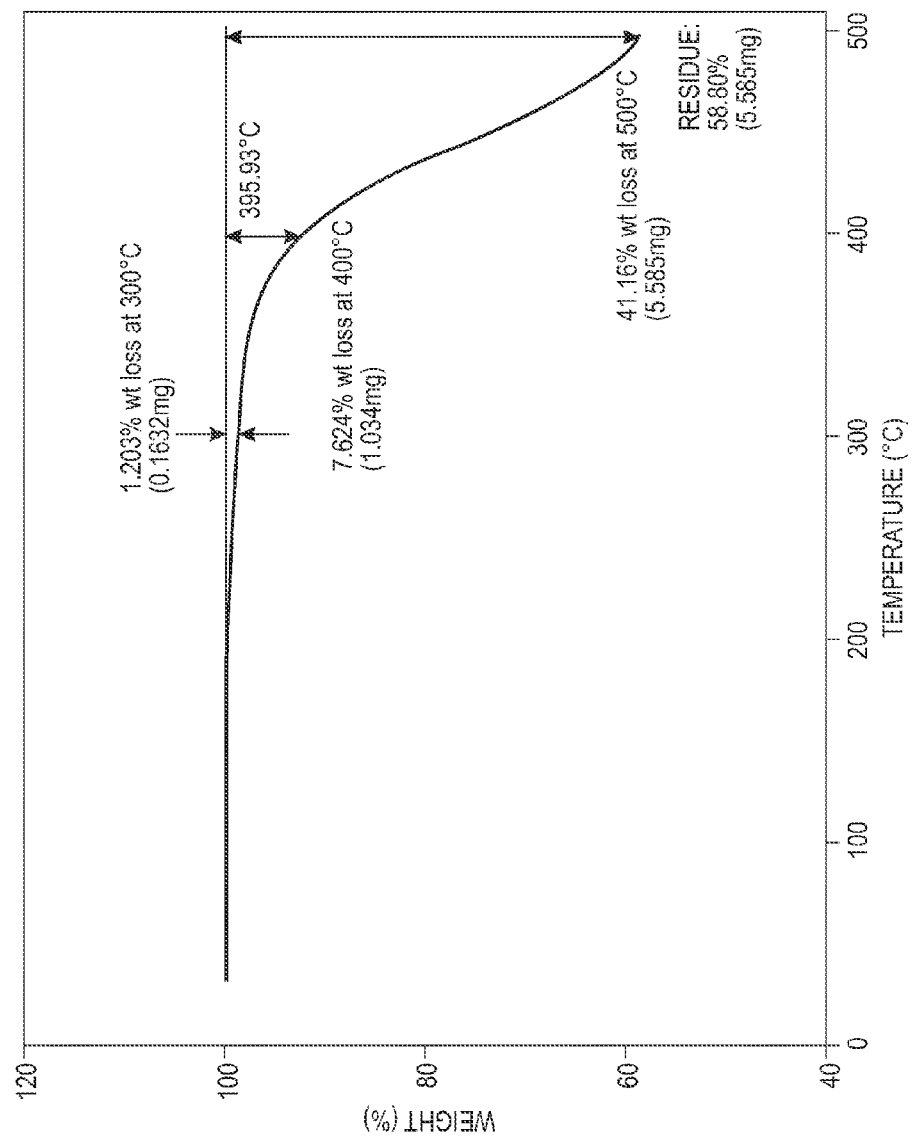
FIG. 3 is a TGA spectra of the surface layer disclosed herein.

In FIG. 2, a polydiphenylsiloxane-based crosslinked network is shown schematically. The diphenylsiloxane moieties are present in the silanol capped siloxane polymer represented in as cross-hatched blocks. The dialkylsiloxane moieties are shown in with a single shading.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The following DPS materials were formulated and coated on a variety of different substrates. In all cases the coatings exhibited strong adhesion to the substrates enabling primer-free application.

Example 1

Silanol terminated dimethylsiloxane-diphenylsiloxane copolymer (3.92 g) (Gelest, Inc., 14-18 mole percent diphenylsiloxane), polydiethoxysilane (1.31 g) (Gelest, Inc.) and triethoxysilane terminated polydimethylsiloxane (1.31 g) (Gelest, Inc., MW=600-900 g mol$^{-1}$) were combined in a vial and mixed by vortex for 10 seconds at 2500 rpm. Cyclohexanone (2.5 g) and titanium acetylacetonate (0.44 g of a 75 percent active solution in IPA; 5 weight percent active catalyst relative to all siloxanes) were added to the vial. The solution was mixed by vortex for 10 seconds at 2500 rpm. The coating solution was filtered through a 0.45 micron PTFE filter immediately prior to coating to remove any particulates. The coating solution was coated on polyimide, aluminum, silicone or Mylar substrates or cast onto quartz yielding uniform coatings. The coatings formed a stable wet layer on all substrates tested. The coatings were cured at 130° C. for 1 hour yielding clear uniform films.

Example 2

Silanol terminated dimethylsiloxane-diphenylsiloxane copolymer (3.26 g) (Gelest, Inc., 14-18 mole percent diphenylsiloxane), polydiethoxysilane (1.09 g) (Gelest, Inc.) and triethoxysilane terminated polydimethylsiloxane (3.25 g) (Gelest, Inc., MW=600-900 g mol$^{-1}$) were combined in a vial and mixed by vortex for 10 seconds at 2500 rpm. Cyclohexanone (2.5 g) was added to the vial, followed by titanium acetylacetonate (0.44 g of a 75 percent active solution in IPA; 5 weight percent active catalyst relative to all siloxanes). The solution was mixed by vortex for 10 s at 2500 rpm. The coating solution was filtered through a 0.45 micron PTFE filter immediately prior to coating to remove any particulates. The coating solution was draw-down coated on polyimide or aluminum or silicone or Mylar substrates or cast onto quartz yielding uniform coatings. The coating solution formed a stable wet layer on all substrates tested. The coatings were cured at 130° C. for 1 hour yielding clear, uniform film.

Example 3

Silanol terminated dimethylsiloxane-diphenylsiloxane copolymer (3.30 g) (Gelest, Inc., 14-18 mole percent diphenylsiloxane), polydiethoxysilane (3.25 g) (Gelest, Inc.) were combined in a vial and mixed by vortex for 10 s at 2500 rpm. Cyclohexanone (2.6 g) was added to the vial, followed by titanium acetylacetonate (0.44 g of a 75 percent active solution in IPA; 5 weight percent active catalyst relative to all siloxanes). The solution was mixed by vortex for 10 s at 2500 rpm. The coating solution was filtered through a 0.45 micron PTFE filter immediately prior to coating to remove any particulates. The coating solution was draw-down coated on polyimide or aluminum or silicone or Mylar substrates or cast onto quartz yielding uniform coatings. The coating solution formed a stable wet layer on all substrates tested. The coatings were cured at 130° C. for 1 hour yielding clear, uniform films.

Examples 1-3 were subjected to ATR-IR analysis. The ATR-IR spectra revealed minimal —OH stretching and is consistent with complete or near complete condensation of all silanol functional groups (complete reaction). The surface free energy of each film was measured and the resulting values are reported in Table 1.

TABLE 1

Surface Free Energy of Coatings Produced in Example 1-3.

| Coating | Surface Free Energy SFE-0.1 s (mN/m) | | | |
| --- | --- | --- | --- | --- |
| | LW | − | + | Total |
| PDMS | | | | 18-20 |
| Viton-GF | | | | 22-24 |
| Example 1 | 22.65 | 7.31 | 0.87 | 27.7 |
| Example 2 | 23.77 | 8.69 | 0.35 | 27.3 |
| Example 3 | 26.05 | 8.10 | 0.37 | 29.5 |

Thermogravimetric analysis (TGA) spectra were collected to evaluate thermal stability All coatings were stable to 300° C. The coatings exhibited 1.2 weight percent loss at 300° C.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:
1. A transfer member for use in aqueous ink jet printer, comprising:
    a surface layer of a cross-linked polydiphenylsiloxane network formed from:
    a silanol terminated dialkylsiloxane-diphenylsiloxane copolymer; and
    a trialkoxy- or trihydroxysilane terminated polydialkylsiloxane;
    wherein diphenylsiloxane moieties comprise from about 5 weight percent to about 80 weight percent of the network, wherein the a trialkoxy- or trihydroxysilane terminated polydialkylsiloxane comprises from about 1 weight percent to about 60 weight percent of the network and all silane molecules are bonded together via silicon oxide (Si—O—Si) linkages in a single system and wherein the network is insoluble in solvents selected from the group consisting of: ketones, chlorinated solvents and ethers.

2. The transfer member of claim 1, wherein the network further comprises a polydialkoxysilane.

3. The transfer member of claim 2, wherein the polydialkoxysilane comprises from about 0.1 weight percent to about 20 weight percent of the network.

4. The transfer member of claim 2, wherein the polydialkoxysilane is represented by:

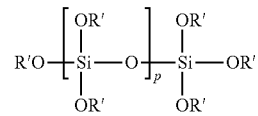

wherein R' is a hydrogen atom, or an alkyl group containing from about 1 to 30 carbon atoms, and p is from about 0 to about 100.

5. The transfer member of claim 1, wherein the silanol terminated dialkylsiloxane-diphenylsiloxane copolymer is represented by:

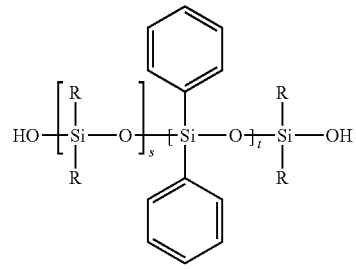

wherein R is an alkyl group containing from about 1 to 30 carbon atoms and s is from about 1 to about 500 and t is from about 1 to about 300.

6. The transfer member of claim 1, wherein the trialkoxy- or trihydroxysilane terminated polydialkylsiloxane is represented by:

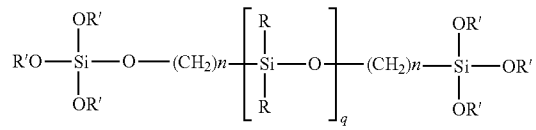

wherein R is an alkyl group containing from about 1 to 30 carbon atoms, R' is a hydrogen atom, or an alkyl group containing from about 1 to 30 carbon atoms, n is from about 0 to about 50 and q is from about 1 to about 200.

7. The transfer member of claim 1, wherein the network further comprises from about 0.1 weight percent to about 5 weight percent of a catalyst selected from the group consisting of: titanate catalysts, zirconate catalysts and tin catalysts.

8. The transfer member of claim 1, wherein the network comprises from about 10 weight percent silicon to about 60 weight percent silicon.

9. An ink jet printer comprising:
a transfer member comprising a surface layer of a cross-linked polydiphenylsiloxane network formed from:
a silanol terminated dialkylsiloxane-diphenylsiloxane copolymer;
a trialkoxy- or trihydroxysilane terminated polydialkylsiloxane; and
a polydialkoxysilane,
wherein the polydialkoxysilane is present in an amount of from about 0.1 weight percent to about 20 weight percent of the network, wherein diphenylsiloxane moieties comprise from about 5 weight percent to about 80 weight percent of the network, wherein all silane molecules are bonded together via silicon oxide (Si—O—Si) linkages in a single system and wherein the network is insoluble in solvents selected from the group consisting of ketones, chlorinated solvents and ethers;
a print head adjacent said transfer member for ejecting aqueous ink droplets onto the transfer member to form an ink image;
a transfixing station located adjacent the transfer member and downstream from said print head, the transfixing station forming a transfixing nip with the transfer member at said transfixing station; and
a transporting device for delivering a recording medium to the transfixing nip wherein the ink image is transferred and fixed to the recording medium.

10. The ink jet printer of claim 9, wherein the silanol terminated dialkylsiloxane-diphenylsiloxane copolymer is represented by:

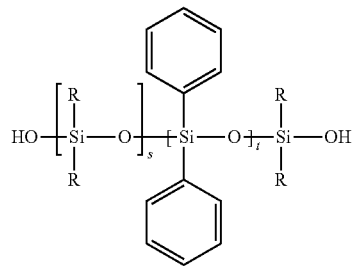

wherein R is an alkyl group containing from about 1 to 30 carbon atoms and s is from about 1 to about 500 and t is from about 1 to about 300.

11. The ink jet printer of claim 9, wherein the polydialkoxysilane is represented by:

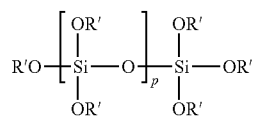

wherein R' is a hydrogen atom, or an alkyl group containing from about 1 to 30 carbon atoms, and p is from about 0 to about 100.

12. The ink jet printer of claim 9, wherein the trialkoxy- or trihydroxysilane terminated polydialkylsiloxane is represented by:

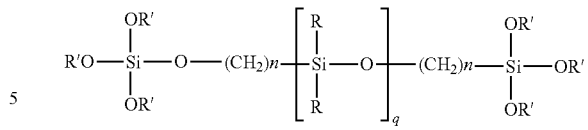

wherein R is an alkyl group containing from about 1 to 30 carbon atoms, R' is a hydrogen atom, or an alkyl group containing from about 1 to 30 carbon atoms, n is from about 0 to about 50 and q is from about 1 to about 200.

13. The ink jet printer of claim 9, wherein the network further comprises from about 0.1 weight percent to about 5 weight percent of a catalyst selected from the group consisting of: titanate catalysts, zirconate catalysts and tin catalysts.

14. The ink jet printer of claim 9, wherein the network comprises from about 10 weight percent silicon to about 60 weight percent silicon.

15. An ink jet printer comprising:
a transfer member comprising a surface layer of a cross-linked polydiphenylsiloxane network formed from:
a silanol terminated dialkylsiloxane-diphenylsiloxane copolymer; and
a trialkoxy- or trihydroxysilane terminated polydialkylsiloxane;
wherein diphenylsiloxane moieties comprise from about 5 weight percent to about 80 weight percent of the network, wherein all silane molecules are bonded together via silicon oxide (Si—0—Si) linkages in a single system and wherein the network is insoluble in solvents selected from the group consisting of ketones, chlorinated solvents and ethers;
a print head adjacent said transfer member for ejecting aqueous ink droplets onto the transfer member to form an ink image;
a transfixing station located adjacent the transfer member and downstream from said print head, the transfixing station forming a transfixing nip with the transfer member at said transfixing station; and
a transporting device for delivering a recording medium to the transfixing nip wherein the ink image is transferred and fixed to the recording medium.

16. The ink jet printer of claim 15, wherein the silanol terminated dialkylsiloxane-diphenylsiloxane copolymer is represented by:

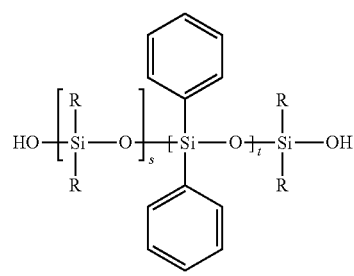

wherein R is an alkyl group containing from about 1 to 30 carbon atoms and s is from about 1 to about 500 and t is from about 1 to about 300.

17. The ink jet printer of claim 15, wherein the trialkoxy- or trihydroxysilane terminated polydialkylsiloxane is represented by:

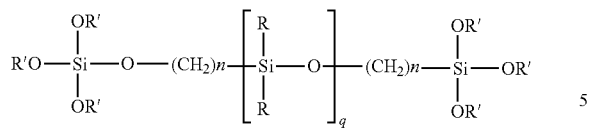

wherein R is an alkyl group containing from about 1 to 30 carbon atoms, R' is a hydrogen atom, or an alkyl group containing from about 1 to 30 carbon atoms, n is from about 0 to about 50 and q is from about 1 to about 200.

18. The ink jet printer of claim 15, wherein the network further comprises from about 0.1 weight percent to about 5 weight percent of a catalyst selected from the group consisting of: titanate catalysts, zirconate catalysts and tin catalysts.

19. The ink jet printer of claim 15, wherein the network further comprises a polydialkoxysilane.

20. The ink jet printer of claim 19, wherein the polydialkoxysilane comprises from about 0 weight percent to about 25 weight percent of the network.

\* \* \* \* \*